United States Patent
Shields

(10) Patent No.: US 9,702,961 B2
(45) Date of Patent: Jul. 11, 2017

(54) EMERGENCY, SECURITY, AND ACCESSIBILITY APPARATUS AND METHODS

(71) Applicant: Intel Corporation, Santa Clara, CA (US)

(72) Inventor: Jon Barton Shields, Escondido, CA (US)

(73) Assignee: Intel Corporation, Santa Clara, CA (US)

( * ) Notice: Subject to any disclaimer, the term of this patent is extended or adjusted under 35 U.S.C. 154(b) by 587 days.

(21) Appl. No.: 14/089,731

(22) Filed: Nov. 25, 2013

(65) Prior Publication Data

US 2014/0148197 A1 May 29, 2014

Related U.S. Application Data

(60) Provisional application No. 61/729,939, filed on Nov. 26, 2012.

(51) Int. Cl.
| | | |
|---|---|---|
| *G01S 5/00* | (2006.01) | |
| *H04W 4/22* | (2009.01) | |
| *H04L 1/22* | (2006.01) | |
| *H04W 4/02* | (2009.01) | |
| *G01S 5/02* | (2010.01) | |

(52) U.S. Cl.
CPC .............. *G01S 5/0009* (2013.01); *H04L 1/22* (2013.01); *H04W 4/22* (2013.01); *G01S 5/02* (2013.01); *H04W 4/02* (2013.01)

(58) Field of Classification Search
CPC ..... H04W 84/20; H04W 84/18; H04W 40/32; H04W 88/16; H04W 4/02; H04W 4/22; H04L 45/46; H04L 1/22; G01S 5/0009; G01S 5/02

See application file for complete search history.

(56) References Cited

U.S. PATENT DOCUMENTS

| | | |
|---|---|---|
| 5,390,181 A | 2/1995 | Campbell |
| 6,278,713 B1 | 8/2001 | Campbell |
| 6,292,493 B1 | 9/2001 | Campbell |
| 6,408,009 B1 | 6/2002 | Campbell |
| 2003/0041150 A1* | 2/2003 | Passman ............... H04W 84/20 709/227 |
| 2005/0129139 A1* | 6/2005 | Jones ........................ G01S 5/14 375/295 |

(Continued)

FOREIGN PATENT DOCUMENTS

EP 1826964 A1 8/2007

OTHER PUBLICATIONS

Form PCT/ISA/220, Notification of Transmittal of the International Search Report and the Written Opinion of the International Searching Authority, or the Declaration (2 pages); Form PCT/ISA/210, International Search Report (3 pages); Form PCT/ISA/237, Written Opinion of the International Searching Authority (6 pages).

*Primary Examiner* — Thai Vu

(74) *Attorney, Agent, or Firm* — Jordan IP Law, LLC

(57) ABSTRACT

Systems, methods, means and computer program products for determining a position of an object in an environment are disclosed. Certain systems, methods, means and computer program products carry out position determination for asset tracking, emergency evacuations, navigation and other uses.

25 Claims, 8 Drawing Sheets

(56) References Cited

U.S. PATENT DOCUMENTS

| | | | |
|---|---|---|---|
| 2006/0290508 A1* | 12/2006 | Moutchkaev | G06K 7/0008 340/572.1 |
| 2007/0106771 A1* | 5/2007 | Lucash | H04L 67/1095 709/223 |
| 2008/0168160 A1* | 7/2008 | Tan | H04W 52/34 709/223 |
| 2008/0309480 A1 | 12/2008 | Youn | |
| 2010/0090823 A1* | 4/2010 | Park | G01S 5/0294 340/539.1 |
| 2011/0130162 A1 | 6/2011 | Park | |
| 2011/0305142 A1* | 12/2011 | Liu | H04W 48/12 370/241 |
| 2013/0005377 A1* | 1/2013 | Wang | H04W 72/0406 455/509 |

\* cited by examiner

EMERGENCY, SECURITY, AND ACCESSIBILITY APPARATUS AND METHODS

FIELD

The disclosure relates generally to systems and methods for determining a position of an object in an environment. In particular, but not by way of limitation, the disclosure relates to position determination for asset tracking, emergency evacuations, navigation, and other uses.

BACKGROUND

Location systems that provide an ability to locate people and things are known. However, such systems have many shortcomings, including their ability to operate in harsh and challenging environments.

SUMMARY

In accordance with the present disclosure, systems, methods and computer program products are described for managing transmission of information among authorized nodes. In one embodiment, a system may comprise any or all of: a plurality of authorized nodes configured to transmit position information associated with a plurality user devices; a cluster head configured to distribute a list of the authorized nodes, where the cluster head is configured to transition among different ones of the authorized nodes depending on one or more conditions; and a gateway, where the gateway is configured to transition with the cluster head.

DRAWINGS

The present application may be more fully appreciated in connection with the following detailed description taken in conjunction with the accompanying drawings.

DESCRIPTION

Figure 1:
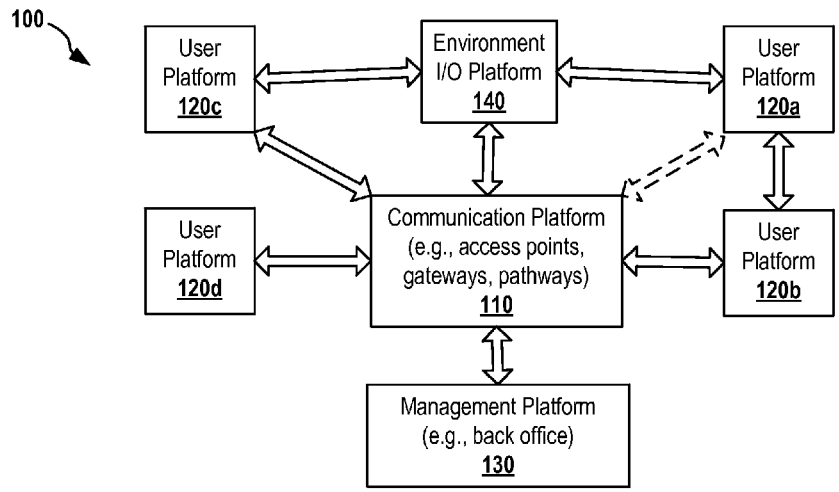
FIG. 1 depicts a system for determining a location of a user device in accordance with an embodiment.

Various aspects of the disclosure are described below. It should be apparent that the teachings herein may be embodied in a wide variety of forms and that any specific structure, function, or both, being disclosed herein is merely representative. Based on the teachings herein one skilled in the art should appreciate that any aspect disclosed may be implemented independently of any other aspects and that two or more of these aspects may be combined in various ways. For example, a system may be implemented or a method may be practiced using any number of the aspects set forth herein. Additional details are provided in the examples below.

Overview

End-to-end hardware and software solutions for determining a position of an object are sought after in various environments. For example, it would be beneficial to locate a person during an emergency, and then correlate that person's position with known environmental factors in order to determine pathways that link the person to emergency services or safety zones in view of adverse environmental conditions (e.g., movement or area of storm or fire, anticipated location of emergency services given road closures, and the like). Often, two-way communication is needed where a person can receive instructions, or where information relating to the person is transmitted to a remote location for processing. In some environments, however, obstacles are present that reduce precision of a position estimate and make efficient two-way communication difficult to achieve. Such environments may include walls, multiple stories, materials, power restrictions and other obstacles that impede effective position determination and associated communication. Some embodiments disclosed herein relate to systems and methods for determining an object's position, or for communicating information to or from that object's position using various devices, or for both. However, other embodiments relate to other features as are described herein or known by one of skill in the art.

Various approaches is used to provide end-to-end hardware and software solutions for determining a position of an object, and/or for transmitting information to or from a device at or near the position of the object. For example, certain embodiments use low-power, wireless technologies for penetrating obstacles (e.g., walls, doors, other obstacles) or reducing reflection and multipath transmission in indoor and outdoor environments. In an embodiment, the 433 MHz ISM band is used. Some embodiments use position determination technologies like RSSI and time-of-arrival measurements, acceleration and orientation of a user device, height/depth of a user device, and fixed grid calculations using data from multiple sources to account for relative position.

Some embodiments use distributing queuing (DQ) technologies for transmission of information among different nodes in an environment. Use of DQ technologies may provide desired reliability, safety, qualify of service (QoS), security, or low power consumption, among other characteristics. For example, reliability may be achieved by predictable levels of throughput, or by minimization of bandwidth fluctuations. Safety may be achieved by having no single point of failure (e.g., a cluster head may transition among different nodes), or by having built-in redundancy and/or failure recovery. QoS may be achieved by prioritizing certain tasks, or by including starvation protection with timed priority promotion. Security may be achieved by encrypted communication, or having multiple forms of authentication. For example, encryption may use a "Promiscuous-Shared Key" with a constantly changing Public Key according to a shared hey generator algorithm.

Low power may be achieved by built-in conservation of power, having nodes know when to transmit, having nodes listen to only data segment header and confirmation segment for new information, having nodes go to sleep the remainder of the time, or having long battery life for asset tracking.

DQ may be a carrier independent broadcast medium mac layer protocol and phy interface with the following attributes: flexibility of mesh-like, peer-to-peer communication without the collisions usually associated with both mesh and most wheel & spoke network architectures; superior mesh-like transmission scheme without the overhead of wheel & spoke, with little to no collisions during data transmissions; can work over any phy; mac layer encryption; efficient sharing of different types of traffic at the mac layer; constant bit rate (CBR) with guaranteed bandwidth (e.g., for "time sensitive" applications like streaming); variable bit rate (VBR) with guaranteed QoS; the mac layer provides starvation free networks; bursty traffic with guaranteed delay; bursty best effort traffic; fixed or dynamically-sized transmission frames with built-in support for configurable "virtual" frame size; power consumption savings (e.g., entry into sleep mode, no retransmissions necessary); high utilization of available bandwidth during period of high-traffic; no dropped frames or damaged frames resulting from collisions; among other attributes.

The above and other technologies are described in more detail below.

Attention is first drawn to FIG. 1, which depicts certain aspects relating to a system 100 for locating an object in an environment with known parameters. The system 100 may be configured to include a communication platform 110, a user platform 120, a management platform 130, and environment input/output platform 140. The term "platform" as used herein may refer to a single component, a grouping of remote components at multiple locations, or a centralized grouping of components at a single location. A platform may include components that may be hosted by, or services that may be offered by parties other than those directly associated with each platform. A platform may further include hardware, software, or other solutions and other components configured to exchange and process data and instructions using various protocols across various network communication pathways. Certain aspects of each platform is described in more detail below. It is to be understood that the description herein is not intended to be limiting, and alternative embodiments are contemplated as understood by one of skill in the art.

Communication Platform 110

The communication platform 110 may be configured to provide communication links among the various other platforms. For example, the communication platform 110 may utilize any one or a combination of known communication networks, protocols, standards and connections to facilitate communication in the system 100, including the Internet, private networks, local area networks, RFID (e.g., DASH7), cellular or other over-the-air wireless carrier interfaces, Bluetooth, Wi-Fi, and other wired and wireless communication pathways. Any communication network may be utilized alone or in combination to provide connectivity for the system 100.

As indicated, the communication platform 110 may also include hardware (e.g., access points, gateways, and the like) to carry out transmission of information among the other platforms. For example, one or more gateways may include one or more transceivers, data sources, inputs/outputs (e.g., buttons, lights, USB and the like), processors and other hardware.

User Platform 120

The user platform 120 may include any suitable computing device that is configured to allow a user to interact with other platforms of the system 100. FIG. 1 shows different user platforms 120a-d, which relate to three different users. Any number of user platforms is contemplated.

The user platform 120 may be any computing system environments or configurations. Examples of well-known computing devices, systems, environments, and/or configurations thereof that may be suitable for use in accordance with particular embodiments of the disclosure include, but are limited to, personal computers, hand-held or laptop devices, mobile phones, tablet and e-readers, wrist bands, watches, cardkeys, ID tags, and programmable consumer electronics. The user platform 120 may include various components, including a display, a processor, a database, a camera, an input/output interface (e.g., a touch screen, keyboard, mouse), a transceiver, and memory from which software may be executed. The user platform 120 may also include various software applications, including those that operate in conjunction with a web browser (e.g., through a LAN connection or radio link), and those that operate without web connectivity. The user platform 120 may comprise a software solution (not shown) with various modules implemented in software to carry out the methods disclosed herein.

In some embodiments, the user platform 120 may include a DASH7 RF interface for two-way communications and localization, a peer-to-peer (P2P) communication capability to communicate with other user platforms 120 (e.g., as shown between user platforms 120a and 120b), a customizable touchscreen display with fields providing messages, instructions, and emergency response, an ability to receive small picture messages and alphanumeric short messages, an end user ability to activate screen in order to send predefined messages (e.g., "person overboard", "emergency," "fire"), and an ability to locate family members, vehicles and other assets (i.e., other user platforms 120).

Management Platform 130

In general, the management platform 130 may be configured to coordinate transmission of information among the platforms, to process information relating to a user platform 120 for purposes of determining the location of that user device 120, to determine physical pathways along which a user or emergency personal should travel during an emergency given various environmental parameters, and other actions. The management platform 130 may be integrated into existing emergency support systems and other back office applications via open APIs to provide: activation of green/red lights (e.g., on background of preconfigured evacuation flow); management of emergency exits, fire separation, and exits in building plan; testing of location lights during normal operation; testing of individual lamps and in groups; or uploading of maps, decks plan in administration interface.

In accordance with certain aspects of the disclosure, the management platform 130 may include one or more input/output interfaces, data sources, memory, processors, or similar components. One of skill in the art will appreciate that some or all of the functionality of the management platform 130 described in further detail below may be performed at one or a combination of the other platforms.

The management platform 130 may comprise a software solution (not shown) with various modules implemented in software to carry out the methods disclosed herein. The processor may be configured to execute instructions embodied in a software solution stored on the memory.

Distributed Queuing

One element that is not addressed by traditional low-power RF topologies is that of mission/safety critical applications. With much of the world moving towards automating environments that require mission and/or safety critical applications, DQ based technologies provide a solution to a mission/safety critical application's primary concern: eliminating single points of failure. Whenever a network is involved in such an environment, one mechanism for addressing this concern is duplication of resources that present potential points of failure. In some embodiments, DQ-based network topologies used have an inherent advantage in this area since the DQ network is controlled by a cluster head that may transition from node to node at any point in time. Thus, having a failure of a given cluster head does not bring down the DQ network.

Additionally, much of the application information that would normally be encapsulated at a higher level within the communication stack has been embedded as part of a MAC header. The resultant advantage is that the amount of overhead necessary to convey the identical information as compared to other technologies has been significantly mitigated. Future extensions may well have alternate information fields within a Protocol Data Unit (PDU) header, where the alternate information fields is application specific. A PDU carries the located and asset tracking information within its header, leaving all other application data to be transported as part of a frame Payload.

DQ may include a Layer 2 Protocol and PHY Transmission scheme that is agnostic to the underlying carrier. There may be two basic types of record keeping header formats: those that are sent during every transmission sequence, otherwise known as PDU segments; and those that are sent only for an entire frame, which can and often does span multiple PDU segments.

In some embodiments, the frame header contains information normally found within an 802.11 type frame, but with one additional address in the event forwarding is necessary by either an address within the DQ Service Set (SS) or to the greater network cloud beyond the cluster head. The address types may include: immediate destination network address; immediate source network address; cluster head MAC address; actual destination MAC address; and original source MAC address. In some embodiments, only the first three addresses are required within normal frames, with the latter two addresses only necessary whenever forwarding is required.

In some embodiments, every DQ transmission frame has the following high-level structure divided into three (3) segments: Contention Window (CW) otherwise known as Access Request Segment (ARS); Control & Data Payload Segment; and Feedback Packet Segment (FPS). Abbreviated transmission frames may consist of only the ARS and FP segments. The ARS is itself divided into three (3) separate Mini-Slots, allowing a requesting node one of three possible entries into the queue for which to make its request. Power savings are enabled by the format of a standard DQ transmission frame where every frame provides length & address fields in the beginning of Control & Data payload segments. After scanning frame length and destination address fields, non-interested nodes may enter low-power mode for the duration of DQ C&D payload segment, waking up prior to the DQSS FPS.

Figure 2:
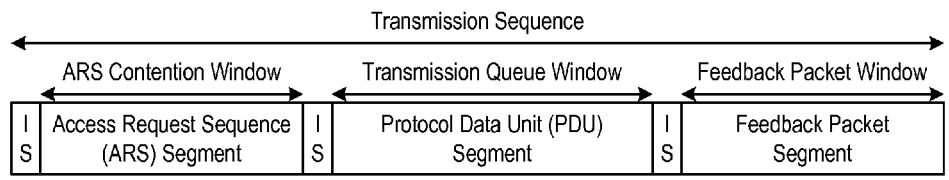
FIG. 2 illustrates a transmission sequence of an embodiment.

FIG. 2 illustrates a transmission sequence of an embodiment (not to scale). As shown, the transmission sequence is divided into three separate segments not counting the interval spacing (IS): the Access Request Sequence (ARS) Segment, which is transmitted during the ARS Contention Window portion of a transmission sequence; the Protocol Data Unit (PDU) Segment, which is transmitted as the middle segment of a transmission sequence; and the Feedback Packet Segment, which is transmitted during the Feedback Window portion of a transmission sequence. A brief overview of each segment is provided below with respect to some embodiments.

ARS Segment—This segment, which is actually divided into a number of sub-segments (typically 3), enables nodes within the DQ/SS with the ability to request permission for exchanging data with other nodes, including the cluster head.

Protocol Data Unit (PDU) Segment—This segment represents both the addressing of the affected nodes exchanging data as well as the actual data itself. Management Commands, Replies, and Requests are also communicated within this segment.

Feedback Packet Segment—This segment provides feedback representing DQ/SS Management that is almost always in direct response to information contained in the immediate prior two (2) segments. It also has the intended side-effect of serving as a beacon, as it is transmitted at the end of every frame and should be used for synchronization and duty-cycling purposes.

Figure 3:
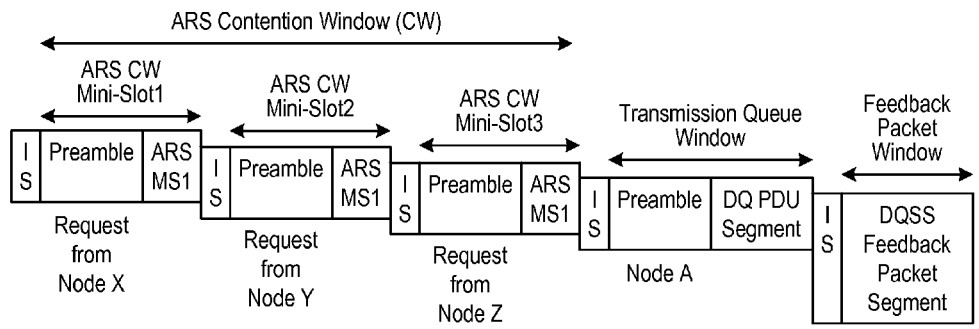
FIG. 3 illustrates a successful transmission sequence of an embodiment.

Any number of different nodes can successfully participate within a single transmission sequence, ome of them within the ARS Segment, one within the DQ PDU Segment, and finally the cluster head within the Feedback Packet segment. The diagram of FIG. 3 illustrates an example of a successful transmission sequence with five disparate transmitters, in accordance with an embodiment.

The Protocol, MAC, and other operational aspects will now be explained in more detail. In some embodiments, a DQ/SS is viewed as a set of nodes within a network that communicate with each other while sharing a common distributed network that is managed by a central controlling authority (i.e., a cluster head). Because DQ is a distributed architecture, communication is peer-to-peer even though control may be centralized. What this means in practice is that the cluster head sends the minimum feedback information to the nodes for them to know their positions in the virtual distributed queues, and which one has access to the physical radio resources without collisions in the data transmission.

Some embodiments have only three types of inter-spacing (IS): ITSS—Inter-transmission sequence Spacing, 24-bits in length; IMSS—Inter Mini-Slot Spacing, 8-bits in length; and ISS—Inter-Segment Spacing, 16-bits in length.

One feature of a DQ/SS is network security and the rules by which nodes may become members of a specific DQ/SS. A DQ/SS can operate in one of three operational modes as follows: Static Association Mode (SA Mode); Semi-Manual Association Mode (SMA Mode); and Promiscuous Mode. In Static Association Mode, the DQ/SS is completely pre-configured. New nodes may not request to join and can only become part of the DQ/SS either by directly adding nodes to an existing DQ/SS Configuration Database or by installing a completely new DQ/SS Configuration Database containing the desired nodes. Since a DQ/SS configured in Static Association Mode cannot add nodes in real time (doing so only through configuration), any attempt to submit a DQ/SS Join Request Code Word during the ARS segment will be ignored.

DQ supports Dynamic Clustering for the Control Point of DQ network topology. If Dynamic Clustering is disabled, the cluster head serves as the static control point. Thus, if the cluster head goes down, so does the DQ network. However, if Dynamic Clustering is enabled, the dynamic cluster head designation order may be included within the DQ/SS and updated separately on a periodic basis.

There are multiple events that may trigger a cluster head transition, including traffic loading, hardware and/or power failures, energy consumption fairness criteria, or simply user discretion. Therefore, in order to support the various types of event triggers, there are multiple selections for the type of Cluster topology configuration. Different Cluster topology configuration types are described below.

Clustering Disabled—The network is complete static, with one and only one node designated as the cluster head. Thus, if the cluster head fails, then so does the network connectivity.

Clustering Enabled for Backup Only.

Limited Clustering Enabled—Normal Clustering is enabled for the network with this setting; however, only a limited set of designated nodes may participate as cluster heads.

Clustering Enabled.

As alluded to above, for clustering to occur within a DQ/SS, not only must the overall Cluster topology be specified, but so must the Clustering Methodology. By way of example, two distinct Clustering Methodologies include: Static Clustering; and Traffic Flow Clustering.

If the Cluster Methodology is set to "Static Clustering", then Dynamic Cluster may be completely disabled. In some embodiments, this is the only setting allowed for the "Clustering Disabled" and "Clustering Enabled for Backup Only" Cluster Topologies. If this setting is used for either the "Limited Clustering Enabled" or "Clustering Enabled" topologies, then the net effect is to force the overall network topology into that of "Clustering Enabled for Backup Only".

Traffic Flow Clustering enables the cluster head to be located at the node providing a balance of the most efficiency with respect to being a "gate keeper" of the traffic flow coupled with providing the greatest coverage for the current traffic flow. The gateway can move with the cluster head in some embodiments, meaning that the cluster head nodes have dual functionality with one port servicing the DQ/SS and other ports servicing one or more gateways.

The cluster head may distribute the list of nodes within the DQ/SS on a periodic basis. In some cases, no node may communicate with another node unless both nodes are contained within the same service set. Because of strict adherence to this policy within some embodiments, in order for a node to join and subsequently communicate with other nodes including the cluster head within the DQ/SS, the following sequence of events must occur: the cluster head must explicitly acknowledge and admit a node for inclusion into the DQ/SS; and the cluster head must then add it to the DQ/SS and perform either a complete or partial DQ/SS update of the DQ/SS table to the nodes within the DQ/SS.

The format of the DQ/SS table may include DQ/SS Configuration Data providing information specifying the functional and operational makeup of the DQ/SS. Information may include the DQ/SS Mode (e.g., Static, Manual, Promiscuous, Promiscuous-Shared Key), Encryption Indication, DQ Gateway Information, Maximum DQ frame and DQ PDU Sizes. The format of the DQ/SS table may further include: 48-Bit MAC address of every Node within the DQ/SS; 12-Bit DQ/SS address assigned by the cluster head to the individual nodes within the DQ/SS as a means of reducing the amount of overhead within the transmission stream; 20-bit Code Word assigned by the cluster head, and used for Access Requests to the Transmission Queue (e.g., this value may be coupled with the DQ/SS address on all access requests); and Active or Inactive Indicators for Every DQ/SS Member.

Given that one purpose of the DQ/SS table in certain embodiments is to maintain the integrity of the network, a DQ/SS table should be viewed as an Object Oriented Encapsulation of a specific DQ network.

Access Request Sequence (ARS) may afford current members of the DQ/SS with an opportunity to request communication privileges with one or more of the other nodes (including the cluster head) within the network. ARS may also simultaneously mitigate the potential for collisions during the Transmission Queue Window and mitigate dropped transmission sequences resulting from corruption. The latter may be achieved by limiting the contention for access to the channel to a finite and predictable period of time. With the exception of the cluster head, nodes can utilize this mechanism in order to access the DQ PDU segment of the DQ transmission sequence.

Figure 4:
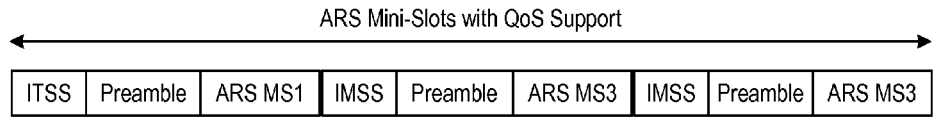
FIG. 4 depicts an ARS Segment Structure of an embodiment.

In some embodiments, the ARS Segment is divided into three (3) sub-parts, termed, Mini-Slots (MS) as shown in FIG. 4, which depicts an Access Request Sequence Segment Structure of an embodiment. The collision resolution process is made to work faster than the data transmission process when the number of MS is restricted to three (3). Increasing the number of MS beyond three (3) may introduce additional delay as well as adding increased overhead to the overall protocol resulting from the added delay. However, for some specific applications where the traffic load does not follow a Poisson pattern or different QoS requirements have to be supported, it could be perfectly possible to adapt this number and improve the performance for a specific metric. The collision resolution process referenced above utilizes unique patterns transmitted by each soliciting device and a summation of those patterns in the event of a collision as a means for detecting collisions.

In some embodiments, the operation of DQ is based on the m-ternary feedback information on the state of each of the mini-slots. The cluster head must be able to distinguish between the three states for each one of the mini-slots: Idle (no ARS sent in an mini-slot); Success (only one ARS sent in a mini-slot); and Collision (more than one ARS (no matter how many) sent in a mini-slot). This information is crucial for the application of the protocol rules at the end of each frame. Each node may be assigned a unique bit pattern that has the property that when two or more ARS collide, the pattern of the overlapping signal is distinguishable from the original pattern of any single ARS; hence, the cluster head can detect the collision.

Figure 5:
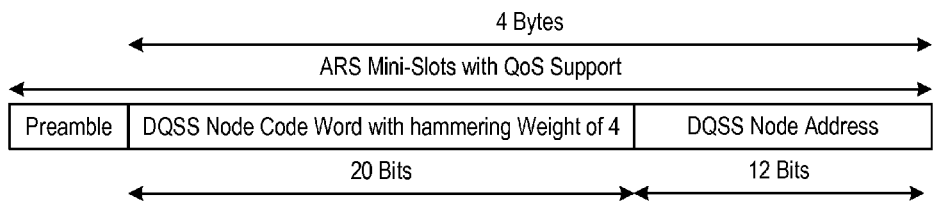
FIG. 5 depicts a DQ Mini-Slot (MS) Structure of an embodiment.

The preferred example patterns may include binomial coefficients; however, DQ uses an increased hamming weight of four (4) in order to support a significantly increased number of unique code words than can otherwise be supported with a constant hamming weight of two (2). For instance, within a 32-bit word, there exists only 496-Code Words with a Hamming Weight of two, as compared to 35,960-Code Words having a Hamming Weight of four within the same 32-bits (almost two orders of magnitude more). In some embodiments where DQ is targeting potential MESH networks much larger than 496 nodes, larger Hamming Weights are necessitated for real-world implementation with (as mentioned above) four (4) being the current selected Hamming Weight. Each node accepted into the network is assigned both a 12-bit Node address and a 20-bit Code Word with a Hamming Weight of four (4). FIG. 5 depicts a DQ Mini-Slot (MS) Structure of an embodiment.

When a collision does occur, it is a relatively straightforward process to determine since the Hamming Weight will be greater than four (4). There are 4,845 4-Bit Code Words within a 20-bit binary string; thus, the worst case probability that a collision could occur and result in a valid Code Word is less than ½ of a percent (0.46%). However, since the Code Word is also coupled with the Node address, there is an additional safeguard procedure to ensure that any anomalous undetected collision is immediately detected. The aforementioned ternary decision is subsequently determined as follows: Idle (e.g., no signal in ARS Mini-Slot; Received Signal is below the RSSI (Noise) Threshold); Success (A demodulation resulting in a precise hamming weight of four (4) and a correlated (i.e. correct) code word value and node address combination); and Collision (Any signal detected above the noise (RSSI) threshold not resulting in a translation into the digital domain of a code word with a hamming weight of four (4) and/or not having a correlated (i.e. correct) code word value and node address combination).

In some embodiments, the cluster head will respond with the collision results as part of the DQ/SS Management Segment in order to clarify any potential ambiguities. Only 1.5 bits per mini-slot are required for this information. In the case of having 3 mini-slots, 5 bits will be required, allowing 32 possible cases where actually only 27 will be used. The remaining 5 states is reserved for future control information and/or commands.

It is presumed that in most cases, DQ will be utilized with some level of QOS enabled. If so, two additional fields are added to the ARS Mini-Slot structure so that the feedback packet can adequately determine the queuing order for each node: Requested Message Payload Limit, and Requested Message Priority. Each field is 4-bits, which in turn expands each ARS Mini-Slot to a Preamble plus 40-bits of information.

Figure 6:
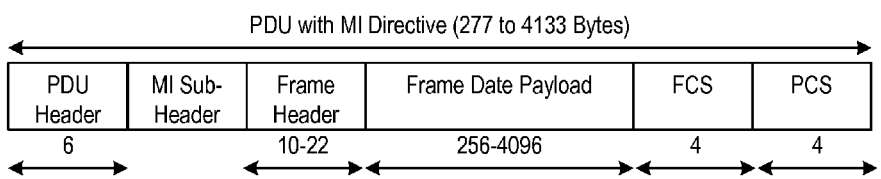
FIG. 6 depicts a DQ node network address field of an embodiment.

DQ/SS network addresses may be 12-bits in length, where only the lower 10-bits are assignable for the dynamic portion of a valid address; as the upper two bits have special meaning. FIG. 6 depicts a DQ node network address field of an embodiment.

DQ/SS Node Cluster Bit (0)—not used within the ARS, but will be explained here since this bit is part of the DQ/SS Node Address Field. In some embodiments, this bit is zero during the ARS, since the cluster head may preempt the Transmit Queue any time it deems necessary to do so and is not restricted to the transmit request process as are nodes within the DQ/SS. The MSB of the address is reserved for the cluster head. This is particularly helpful if the network topology moves and the cluster head moves with it. Thus, allowing any node to maintain its original identity both before and after assuming the duties of the cluster head. In this way, the DQ/SS table maintains consistency regardless of which node is currently in charge of the network.

DQ/SS Node Join Request Bit (1)—used by nodes wishing to join the network. In order for an unknown node to be considered for admittance to the DQ/SS, it must satisfy two conditions: the "Join Request" Bit shown in Figure must be set within the DQ/SS Node address Field; and the "DQ/SS Mini-Cluster" Sub-Field must set '7' (i.e. "111b"). The "DQ/SS Individual address" Sub-Field may be any value between '0' and "127" (i.e. a span of 128-values).

DQ/SS Mini-Cluster Subfield Bits (2-4)—used to allow the network administrator to organize nodes in accordance to their own internal policies. Assignable values are between '0' ("000b") and '6' ("110b"), with '7' ("111b") reserved for "Join Requests" and "Broadcasts".

DQ/SS Individual address Subfield Bits (5-11)—used for assigning individual addresses, with any value between '0' and "126" assignable for an individual DQ/SS network address. The only time "127" may be used during the ARS is during a "Join Request." As "127" is otherwise set aside for "Directed Broadcasts" and regular "Broadcasts" for all Mini-Cluster Sub-Field values except for '7' (i.e. "111b").

In some embodiments, ARS "Join Requests" may choose between any one of 128 values for the DQ/SS Individual address Sub-Field and any one of 17-values for the Code Word. So long as predefined values are selected for those fields as well as the "Join Request" bit being set, the Join Request will be considered valid.

The DQ Queue Transmission Window is the portion of the transmission sequence in which application data is communicated and is the most complex of the three segments comprising the transmission sequence. The three segments are the DQ ARS Segment, the DQ PDU Segment, and the DQ Feedback Packet Segment.

Figure 7:
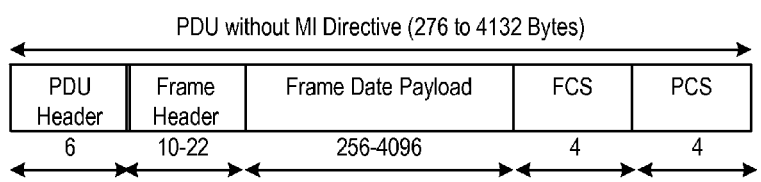
FIG. 7 illustrates a DQ PDU of an embodiment.

The DQ PDU Segment encapsulates the entire set of data within the DQ Queue Transmission Window. DQ Packet Segments may be comprised of: A DQ PDU Segment Pre-header; An optional Management Information (MI) Sub-header and Directives; An optional frame Data header & Payload section, including an optional frame Check Sequence (FCS) (FCS may not be needed if the entire frame is encapsulated within a single PDU); and A 4-Byte PDU Check Sequence (PCS). FIG. 7 illustrates a DQ PDU with Context Dependent FCS of an embodiment.

In some embodiments, the FCS is only applied to the payload portion of the message plus the four bytes of the FCS itself. If there is an MI sub-header, but no DQ frame present, then the entire DQ PDU could be as small as eleven (11) bytes.

The most basic DQ PDU is often one in which the entire frame is contained within the packet and has no MI Directives. However, DQ PDU's may also contain Management Information (MI) Directives, frame Check Sequence (if the entire frame is not contained within one PDU), and may even exclude a Data Payload portion if only MI Directives are required for a given PDU. The individual elements of the Basic DQ PDU will now be detailed in order to provide the framework for the more complex Packet Segments discussed later in this section.

The MI Sub-header provides a mechanism for Communication and Control Directives and associated data between DQ Nodes and has only one mandatory field, the DQ/SS. Frame Control Sequence (FCS) is a 32-Bit CRC located immediately following the last byte transmitted for a given DQ frame. In some cases, there are only two instances where this field would appear: When the Data Fragment Management field is set to "011b"—Indicating the PDU contains a "Resumed frame with a Final Data PDU" (Meaning, it is the last PDU of previously interrupted sequence of PDUs for the associated DQ frame); and When the Data Fragment Management field is set to "100b"—Indicating the frame is a "Final Data PDU" (Meaning, it is the last PDU of sequence of PDUs for the associated DQ frame). In some cases, the FCS is only applied to the DQ frame portion of the DQ PDU payload portion of the message plus the four bytes of the FCS.

Figure 8:
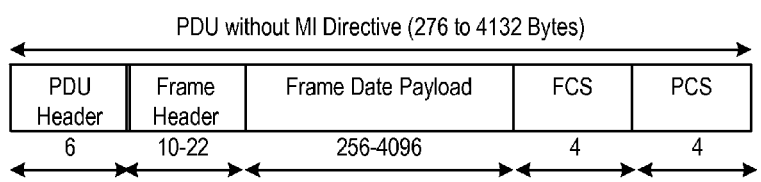
FIG. 8 illustrates a basic DQ PDU of an embodiment.
Figure 9:
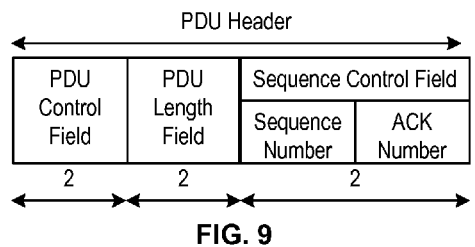
FIG. 9 illustrates a DQ PDU header Structure of an embodiment.

FIG. 8 illustrates a basic DQ PDU of an embodiment. It can be between 276 and 4,132-bytes in length and may be comprised of the DQ PDU header, the DQ frame header, the DQ frame Data Payload, and the PDU Check Sequence (PCS), but also may include a frame Length Field and frame Check Sequence (FCS) depending upon the type of packet. DQ PDUs may have a DQ PDU header and have the following three fields: the PDU Control Field, the PDU Length Field, and the Sequence Control Field. These three fields provide the majority of the information required for describing the PDU's content. FIG. 9 illustrates a DQ PDU header structure of an embodiment.

The first field, the PDU Control field provides detailed information about both the packet itself as well as the current configuration of the network. This is most helpful to nodes listening in that may need to adjust their own configuration prior to attempting to enter into the DQ/SS. The settings within the PDU control field detail the contents of the packet, including whether or not the DQ frame portion of the PDU is an entire frame or one in a series of fragmented frame segments.

Figure 10:
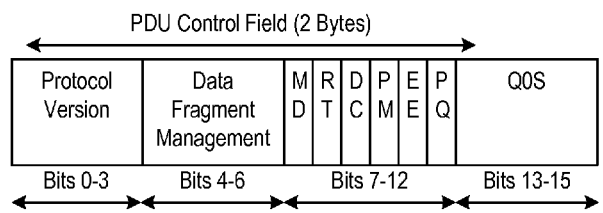
FIG. 10 illustrates a DQ PDU Control Field of an embodiment.

FIG. 10 illustrates a DQ PDU Control Field of an embodiment. The contents of the PDU control bits determine the size and content of the rest of the frame and therefore are the most interesting portion of this segment. The fields and meanings are provided as follows.

DQ Protocol Version Field Bits (0-3). The DQ Protocol Version is initially set to "0000b" and is set aside as a backwards compatibility measure in anticipation that future use of DQ will expand beyond what is currently envisioned and hence require structure and format changes.

DQ Data Fragment Management Field Bits (4-6). The Data Fragment Management field provides information to the recipient node enabling the receiving station to discern if this frame is part of a larger fragmented frame or not. If so, these settings directly determine whether or not packet contains a frame Length field as is the case with completely encapsulated frames, the initial segment of a fragmented frame, and the initial segment of a fragmented resumed frame.

Additionally, the settings contained within determine if the DQ PDU contains Application Data and/or if the packet simply contains DQ/SS Management Information. Data Fragment Management Field Settings may include: Management PDU with no Application Data; Reserved First Data PDU of frame; Reserved First Resumed PDU of frame; Reserved Resumed frame with Final Data PDU of frame; Reserved Final Data PDU of frame; Reserved Intermediate Data PDU of frame; Complete frame within PDU; and Reserved.

Management frame—000b. This field indicates that there is no Application Data within this PDU. Therefore, the PDU is strictly for management and control purposes.

First Data PDU of frame—001b. This value indicates the frame is fragmented and that the packet is the initial packet in a sequence of packets comprising the overall frame. All necessary address fields for the frame are included with this packet as well as a frame length field.

First Resumed Data PDU of frame—010b. This value indicates the frame transmission sequence was previously preempted by higher priority traffic and that the packet is the first PDU in the resumption of the frame transmission sequence.

Address fields for the frame may be repeated within this PDU including the frame length field. The length contained with the frame length field specifies the number of bytes left within the resumed frame including the bytes within the current packet.

Resumed frame with Final Data PDU of frame—011b. This value indicates the frame is fragmented and that this is the first PDU following a pause in the PDU sequence transmissions for that frame, as the transmission sequence was previously preempted by a higher priority form of traffic. It also indicates that this is the final fragment within the sequence. The frame address fields are again repeated for this final packet; however, the frame length field is not included since it is superfluous given that the DQ PDU Segment Pre-header contains the length of the entire packet and hence the payload length is easily calculated from it.

Last Data PDU of frame—100b. This value indicates that the data segment contains the last segment of a larger message. There are no frame address fields following the DQ PDU Segment Pre-header for this case; but there is an FCS as well as PCS.

Intermediate Data PDU of frame—110b. This value indicates that the data segment contains an intermediate segment of a larger message. There are no frame address fields following the DQ PDU Segment Pre-header for this case; nor is there an FCS.

Figure 11:
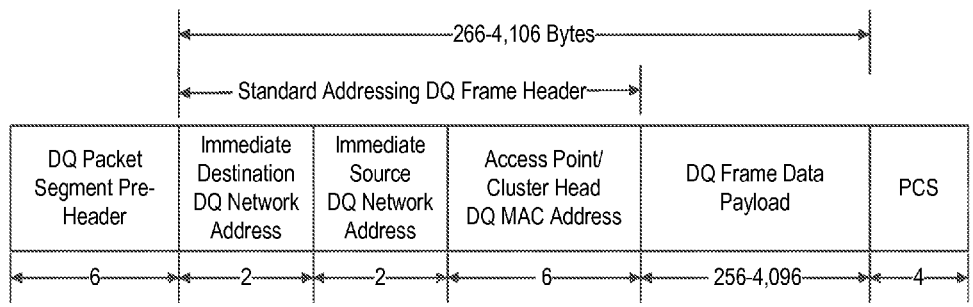
FIG. 11 illustrates a single DQ Packet of an embodiment.

Complete frame within Data Packet—011B. This value indicates that the DQ PDU contains the entire DQ frame. The frame address fields immediately follow the DQ PDU header; however, there is neither a frame Length field nor a frame Check Sequence (FCS) field, as both would be redundant if included. FIG. 11 illustrates a single DQ Packet containing a complete DQ frame of an embodiment.

Management Directive (MD)—Bit (7). If set, this bit indicates that there is Management Information (MI) header within the packet and that the MI Sub-header is located immediately following the DQ Packet Segment Pre-header and before the address and/or Payload fields if any.

Retransmission Bit (RB)—Bit (8). If set, this bit indicates that the packet is a retransmission of a previously transmitted packet. This is used by the receiver station to determine that this may be a duplicate transmission of prior frames as result of an Acknowledgement being lost.

Dynamic Clustering Enable Bit (DC)—Bit (9). If set, this bit indicates that the cluster head is Dynamic; thus, the cluster head will change in real time according to predefined rules. Power Management Bit (PM)—Bit (10). If set, this bit indicates the Power Management mode that the station will be in after the transmission of the frame; this bit is used by stations that are changing state from Power Save to Active or vice-versa. Encryption Bit (EE)—Bit (11). If set, this bit indicates encryption is enabled; Priority Queuing Enable Bit (PQ)—Bit (12). If set If set, this bit indicates priority queuing is enabled.

Quality of Service (QoS) Level Bits (QoS)—Bits (13-15). If set, this field only has meaning if the Priority Queuing Enable Bit is set and there is Application Data within the payload; otherwise these bits are unused. There are eight levels of priority, with the level of priority increasing linearly with the value of the QoS bits: Lowest Priority: "000b" . . . . Highest Priority: "111b". PDU Length Field provides the length of the entire DQ frame, including the FCS. PDU Sequence Control Field keeps maintain control of the application data exchanged between DQ/SS nodes.

The Sequence Number identifies the last PDU from the sending station sent to the destination station. The Sequence Number is checked at the receiver for missing or duplicated PDUs. A station receiving a numbered information PDU advances its $N_r$ count if the PDU received is in sequence and does not have errors. The receiving station's $N_r$ count will be equal to the $N_s$ in the next expected information packet or one greater than the $N_s$ in the last PDU received. The receiver confirms accepted numbered information PDU by returning its $N_r$ count to the transmitting station. If the incoming $N_s$ doesn't agree with the receiving station's $N_r$ count, the PDU is out of sequence and $N_r$ does not advance. The $N_r$ in the out-of-sequence PDU is still valid for confirming transmitted PDU. The count range for $N_s$ and $N_r$ is 256, using the digits 0 through 255. Once the sequence number 255 is reached, the count wraps back around to 0. The $N_r$ and $N_s$ counts are initialized to 0.

DQ Acknowledgement Number Field. The Acknowledgement Number identifies the last PDU the sending station has received from the destination station. The Acknowledgment Number is checked at the destination for missing or duplicated packets. If the incoming $N_r$ does not agree with the receiving stations $N_s$, the receiving station must reset its $N_s$ to match the incoming $N_r$ and resend any missing PDUs not received by the sending station the next time it gains control of the queue. The count range for $N_s$ and $N_r$ is 256, using the digits 0 through 255. Once the sequence number 255 is reached, the count wraps back around to 0. The $N_r$ and $N_s$ counts are initialized to 0.

Figure 12:
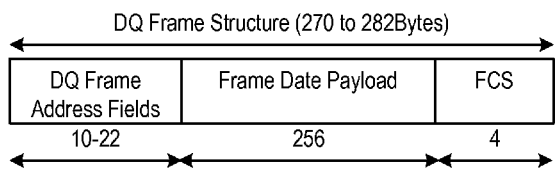
FIG. 12 illustrates a DQ frame Structure of an embodiment.

A DQ frame is what is presented as the interface between the MAC and network layers and may consist of: Address Fields; Frame Length Field; Data Payload area; and a Frame Check Sequence (FCS) Field. FIG. 12 illustrates a DQ Frame Structure of an embodiment. DQ PDUs utilize the same addresses as do DQ frames; however, because DQ PDUs can and often are much smaller; these DQ frame address fields are not repeated for multi-PDU frames unless otherwise explicitly noted (such as in the case of a "resumed" frame sequence). A DQ frame is encapsulated either within one single DQ PDU or divided across multiple PDUs.

If the frame is to be divided across multiple PDUs, it will always contain a length field prior to the data payload area within the initial packet of the frame sequence and will also contain a frame Check Sequence following the data payload area within the last packet of the frame sequence. Otherwise, if the entire frame is encapsulated within a single DQ PDU, neither of these fields is required since both is deduced from similar fields within the DQ PDU structure (i.e. the PDU Length Field in lieu of the frame Length Field and PDU Check Sequence in lieu of the frame Check Sequence). The DQ frame has two variants for addressing: Internal DQ/SS network addresses; and External DQ MAC address.

A DQ/SS network address is a 12-bit address that uniquely identifies the DQ Node within a specific DQ/SS network. A DQ network address is at most 12-bits, with the uppermost 4-bits of each DQ network address set aside and reserved for future expansion. Thus, the maximum number of nodes potentially supported within a given DQ/SS is 4,096, minus selected addresses set aside for explicit functionalities. However, the uppermost two bits have special significance preventing them from being used as normal address bits. Meaning, the number of stations that can actually be delineated is $2^{10}$ (i.e. 1,024).

With few exceptions (Application Data intermediate frames being noted as the most common exception) most DQ frames include the DQ network address of both the destination and sender along with the DQ MAC address of the DQ cluster head. This is known as the "Standard addressing DQ frame header" and is illustrated in FIG. 11. The Standard DQ address header contains the three address fields: the Immediate Destination DQ network address; the Immediate Source DQ network address; and the cluster head DQ MAC address. With the first two addresses being internal DQ network addresses and the cluster head being a standard DQ MAC address.

Figure 13:
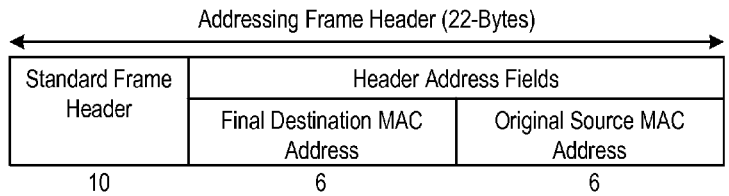
FIG. 13 illustrates an addressing DQ frame header of an embodiment.

The Extended addressing DQ frame header extends the Standard addressing DQ frame header by adding the DQ MAC addresses of the original sender and final destination nodes. FIG. 13 illustrates an extended addressing DQ frame header of an embodiment. This frame is only required if the Final Destination and Original Source Nodes are not part of the same DQ/SS. In this case, the "Destination DQ network address" is set to that of the cluster head. Therefore, any time the cluster head is specified as the "Destination DQ network address", the Extended address DQ frame header is used. One exception is whenever the cluster head is also the final destination, in which case only the Standard DQ frame header is utilized.

The DQ Frame Payload Length Field specifies the number of bytes within the frame payload and must be a number between 256 and 4,096 bytes. The DQ Payload Field carries the data payload of the frame. Other than length, there are no restrictions to the contents of this field. If there are not sufficient bytes to fill the minimum size DQ Payload field, the missing bytes will be zero filled.

DQ frame Check Sequence Field. The FCS is a 32-Bit CRC located immediately following the last byte transmitted for a given frame and covers the entire frame contents, including the four bytes of the FCS.

PDU Data Payload. There is no specific format for the payload portion of the PDU. This is the information that ultimately needs to be "transported" from one location to the next and is agnostic as to what the underlying transportation medium is that is facilitating this.

Frame Check Sequence (FCS). The FCS is a 32-Bit CRC located immediately following the last byte transmitted for a given frame. The only time the FCS is included within an actual DQ Packet is immediately following the last packet of a multi-PDU frame sequence.

PDU Check Sequence (PCS). The PCS is a 32-Bit CRC located immediately following the last byte transmitted for a given PDU and occurs in every single PDU. The structure of a typical packet and PCS is illustrated in FIG. 11. The PCS is applied to the entire packet plus the four bytes of the PCS and as stated in the previous section, negates any need for an FCS for single packet frames.

Figure 14:
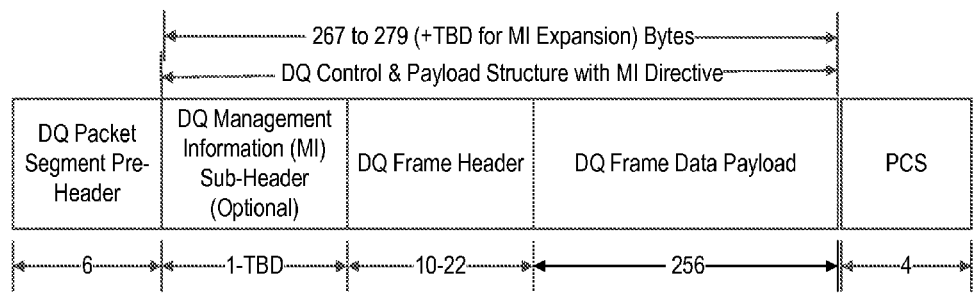
FIG. 14 illustrates a basic DQ PDU Segment of an embodiment.

FIG. 14 illustrates a basic DQ PDU Segment with MI Sub-header of an embodiment. It is between 267 and 279 bytes (plus MI control fields) in length and is comprised of the DQ PDU header, the DQ frame header, the DQ Management Information header and Associated MI Payload (if any), the DQ frame Data Payload, and the PDU Check Sequence (PCS).

Figure 15:
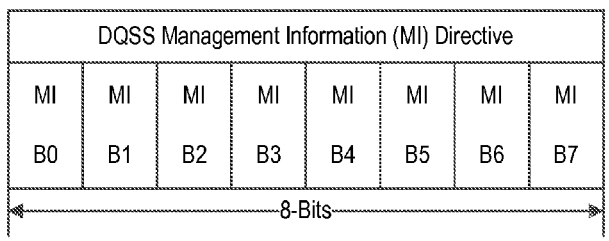
FIG. 15 illustrates an MI Directive Field of an embodiment.

The Management Information (MI) Directive Sub-header. The PDU is a 32-Bit CRC located immediately following the last byte transmitted for a given The MI header provides a mechanism for Communication and Control Directives and associated data between DQ/SS Nodes and has only one mandatory field, the DQ/SS Management Information Directive Field. FIG. 15 illustrates a management Information Directive Field of an embodiment. Any additional fields within the MI Sub-header are MI Directive dependent. The below list details the current list and associated values of all the DQ/SS MI Directives: Reserved; Distribute DQ/Service Set Table Command (no acknowledgement) (see Section for more detail); Mandatory Disconnect Command (no acknowledgement); Disconnect Request (from Station to cluster head); Disconnect Confirmed Response (from cluster head to Station); Join Request (from Station to cluster head); Join Accepted Response (from cluster head to Station); Re-cluster Command (from NEW cluster head); Re-cluster Acknowledge Response (from each individual station within cluster); Link Quality SNR Exchange Request (from cluster head to Station); Link Quality SNR Exchange Response (from Station to cluster head); Bandwidth Management Command (from cluster head to Station); Bandwidth Management Acknowledge Response (from Station to cluster head); Maximum frame Size Command (no acknowledgement) (from cluster head to Stations); Switch Queue Command (no response); Pause Queue Command (no response); Pause Queue, Enable Join Request for Mini-Slot 1; Pause Queue, Enable Join Request for Mini-Slot 2; Pause Queue, Enable Join Request for Mini-Slot 3; Resume Queue Command.

However, while the above list enumerates all of the possible Directives, those directives are divided between ones that are is transmitted during the Feedback Packet segment and those that is transmitted during the DQ PDU Segment.

Distribute DQ/Service Set Table (0x01). This command is a minimum of bytes in length and can only be sent by the cluster head. The DQ/Service Set Table is divided into two sets of parameters.

Figure 16:
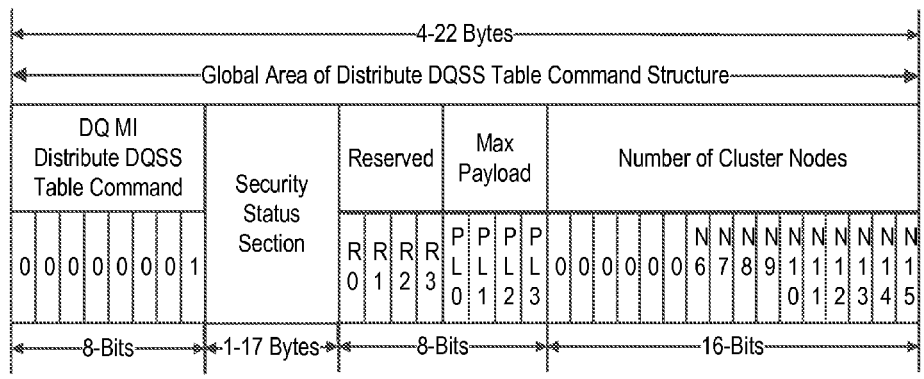
FIG. 16 illustrates a DQ/SS table command of an embodiment.

The first set of parameters are applicable to the entire table and shown below: the Security Status of the DQ/SS (No Encryption (1-Byte); Public Key Encryption (1-Byte); Private (Shared) Key Encryption (1-Byte)); Public Encryption Key (16-Bytes: this field only exists when Security Status is set to "Public Key Encryption"; otherwise, this field is not part of the DQ/SS table); Maximum Packet Payload Limitation of the DQ/SS (1-Byte); Number of Configured DQ/SS Nodes (2-Bytes). FIG. 16 illustrates a distribute DQ/SS table Command Global Parameters of an embodiment.

The remaining parameters are applicable for all DQ/SS Nodes with one entry per Node within the DQ/SS including the cluster head: DQ/SS MAC address; Assigned DQ/SS network address; Assigned DQ/SS Hamming Weight; Assigned cluster head Priority; Assigned QoS Node Priority (This field should be zero (0) for most networks and should only be used if there are specific nodes that need higher priority than others nodes; in those cases in which QoS is on and two nodes are in the queue with the same QoS priority traffic waiting to be sent, the one with the higher priority (if any) moves to the top of the queue for that specific priority setting); Assigned Bandwidth Status (No Bandwidth Guarantee; Limited/Restricted bandwidth; Guaranteed bandwidth); Assigned Bandwidth Setting of each station (i.e. limit or minimum guaranteed value) when applicable.

DQ/SS Security Status & Public Encryption Key Fields. In order to provide the maximum degree of security within the network, the encryption switch is found within the first byte following the DQ/SS table Command byte. Only the least significant lower two bits are valid. The remaining upper six bits are unused and hence reserved.

Figure 17:
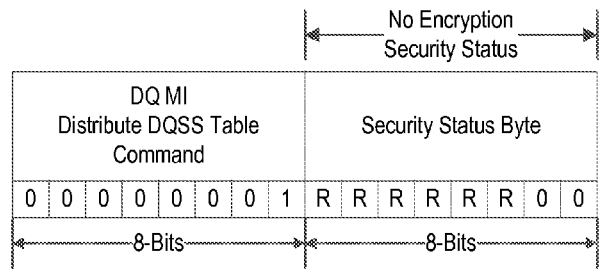
FIG. 17 illustrates a DQ/SS table command of an embodiment.

DQ/SS No Encryption ("00b"). Whenever the Security Status field is set to "DQ/SS No Encryption", then there are no additional fields, thus the first two bytes of DQ/SS table are simply the command and security status fields. FIG. 17 illustrates a distribute DQ/SS table Command Structure with Encryption Disabled of an embodiment. In this case, the remaining bytes within the DQ/SS table are encrypted using the Shared Encrypted Key possessed by all of the DQ/SS member stations.

Figure 18:
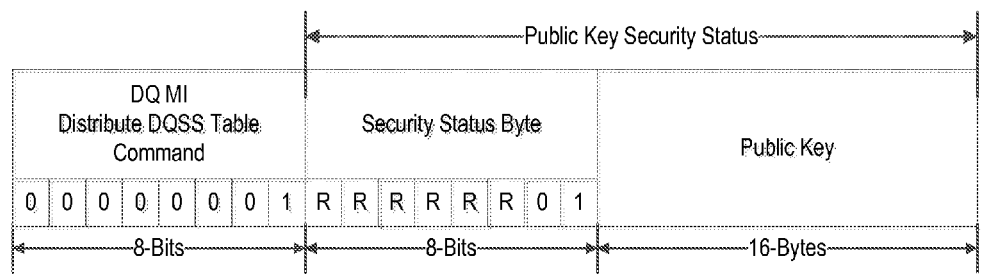
FIG. 18 illustrates a DQ/SS table command of an embodiment.

DQ/SS Public Key Encryption ("01b"). Whenever the Security Status field is set to Public Key Encryption, then the immediate subsequent field is the Public Key field. FIG. 18 illustrates a DQ/SS Table Command Structure with Public Key Encryption of an embodiment. In this case, the remaining bytes within the DQ/SS table are encrypted using the Public Key.

Figure 19:
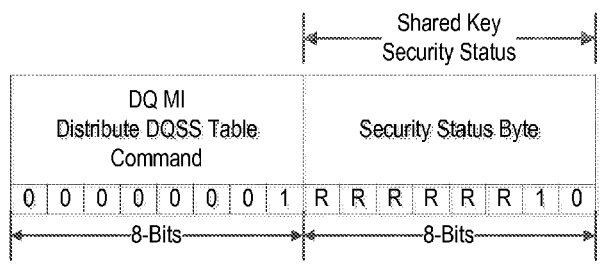
FIG. 19 illustrates a DQ/SS table command of an embodiment.

DQ/SS Shared Key Encryption ("10b"). Whenever the Security Status field is set to Shared Key Encryption, then there is no public key field. FIG. 19 illustrates a distribute DQ/SS table Command Structure with Shared Key Encryption of an embodiment. In this case, the remaining bytes within the DQ/SS table are encrypted using the Shared Encrypted Key possessed by all of the DQ/SS member stations.

Figure 20:
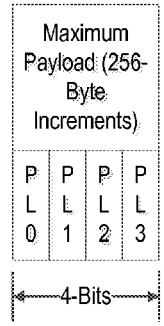
FIG. 20 illustrates a maximum PDU Payload Field of an embodiment.

Maximum PDU Payload Field. The Maximum PDU Payload field enables specifies the maximum number of bytes allowed within the payload portion of a DQ/SS PDU. The minimum allowed PDU payload is 256-bytes and the maximum allowed packet payload is 4,096-bytes. FIG. 20 illustrates a maximum PDU Payload Field of an embodiment. Payload specifications may be given in 256-byte increments with "0000b" representing 256-bytes and "1111b" representing 4,096-bytes.

Figure 21:
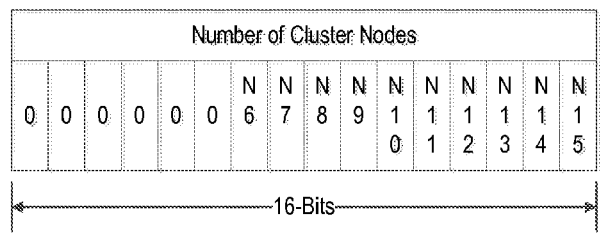
FIG. 21 illustrates a number of configured nodes of an embodiment.

In some embodiments, the Number of Configured DQ/SS Cluster Nodes field can never be zero, since the cluster head always counts as one Cluster Node within the network. Hence, zero a setting of "00000000b" is considered invalid. FIG. 21 illustrates a maximum Number of Configured Cluster Nodes (including cluster head) of an embodiment.

Figure 22:
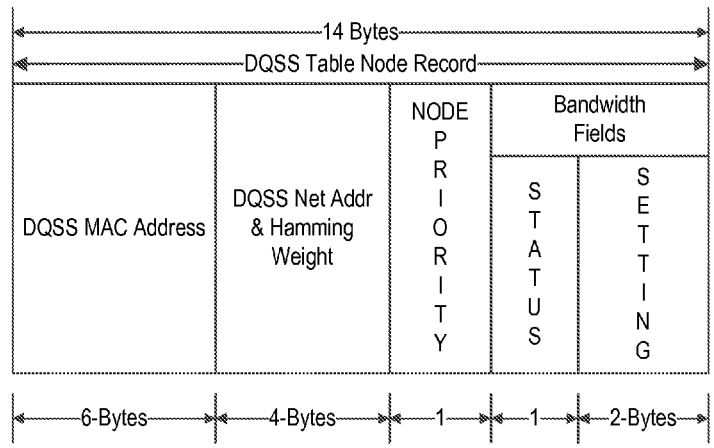
FIG. 22 illustrates a DQ/SS table command of an embodiment.

DQ/SS table Entries (one entry per Cluster Node). The remaining fields within the DQ/SS table are on a per node basis and in the following order for each entry: Bytes 0-5 (DQ/SS MAC address); Bytes 6-9 (Assigned DQ/SS Hamming Weight; Assigned DQ/SS network address); Bytes: 10-11 (Assigned cluster head Priority); Byte 12 (Assigned QoS Node Priority); Byte 13 (Assigned Bandwidth Status: No Bandwidth Guarantee; Limited/Restricted bandwidth; Guaranteed bandwidth); and Bytes 14-15 (Assigned Bandwidth Setting of each station). FIG. 22 illustrates a distribute DQ/SS table Command Node Record Parameters of an embodiment.

Figure 23:
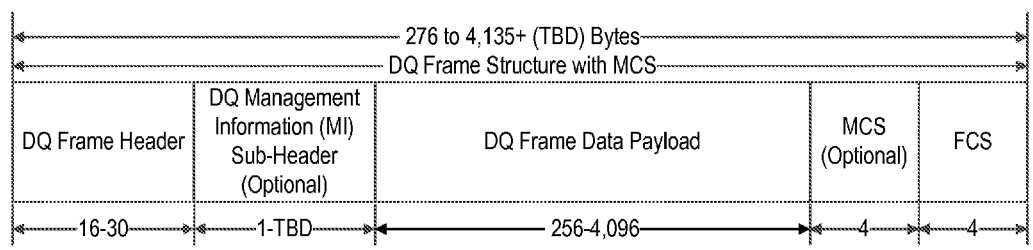
FIG. 23 illustrates an MI Disconnect Command of an embodiment.

Mandatory Disconnect Command. This command is 5-bytes in length and can only be sent by the cluster head to a DQ/SS Client Node. It cannot be ignored by the DQ/SS Client Node. FIG. 23 illustrates a MI Disconnect Command Structure of an embodiment. No response is expected or desired from the affected DQ Client Node. If the DQ Client Node attempts any further communication other than a request to "Join the DQ/SS", the cluster head will in turn respond with another MD command. Distribute DQ Service Set Table Commands may include: Mandatory Disconnect (no acknowledgement); Disconnect Request (from Station to cluster head); Disconnect Confirmed (from cluster head to Station); Join Request (from Station to cluster head); Join Accepted (from cluster head to Station); Re-cluster Command (from NEW cluster head); Re-cluster Acknowledge (from each individual station within cluster); Link Quality SNR Exchange Request (from cluster head to Station); Link Quality SNR Exchange Response (from Station to cluster head); Bandwidth Management Command (from cluster head to Station); Bandwidth Management Acknowledge (from Station to cluster head); Maximum frame Size Command (no acknowledgement) (from cluster head to Stations); Switch Queue; Pause Queue; Pause Queue, Enable Join Request for Mini-Slot 1; Pause Queue, Enable Join Request for Mini-Slot 2; Pause Queue, Enable Join Request for Mini-Slot 3; and Resume Queue. The MI Sub-header provides a mechanism for Communication and Control Directives and associated data between DQ/SS Nodes and has only one mandatory field, the DQ/SS.

Figure 24:
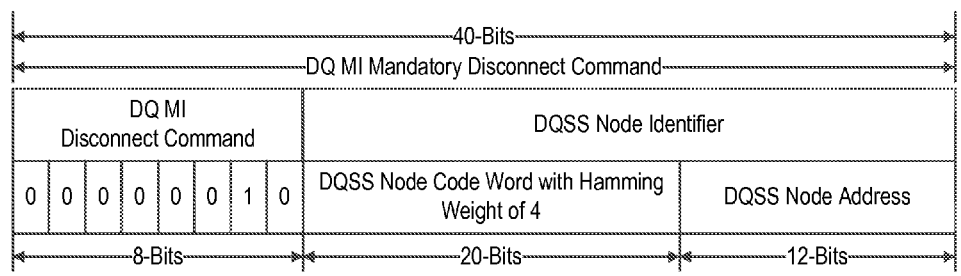
FIG. 24 illustrates a frame Check Sequence of an embodiment.

Frame Control Sequence (FCS). The FCS is a 32-Bit CRC located immediately following the last byte transmitted for a given frame. This field is not part of a frame whose payload comprises a complete frame. There are only two instances where this field would appear: When the Data Fragment Management field is set to "011b" (Indicating the frame is a "Resumed Message with Final Data Segment" frame. Meaning, it is the last frame of previously interrupted sequence of frames for the associated message.); When the Data Fragment Management field is set to "100b" (Indicating the frame is a "Final Data Segment" frame. Meaning, it is the last frame of sequence of frames for the associated message.) FIG. 24 illustrates a frame Check Sequence within frame Segment of an embodiment. The FCS may be applied to the payload portion of the message plus the four bytes of the FCS.

Management Information (MI) Directives. This document describes the high level operational perspective of the MI Directives that are used to maintain and control the network. Directives initiated by the cluster head are usually intended to maintain the order and integrity of the overall DQ/SS network. While directives initiated by DQ/SS Client Nodes are generally used for a specific service or action for that particular DQ/SS Client Node. Each MI Directive will now be individually detailed, including a complete description of its use, its structure, and intended actions resulting whenever it is used. MI directives may include: Distribute DQ Service Set Table (0x1) Distributes DQ/Service Set Table; Mandatory Disconnect (0x02) Forces a Cluster Node out of the DQ/SS; Disconnect Request (0x03) Request by Cluster Node to disconnect; Disconnect Confirmed (0x04) Confirmation from cluster head to Cluster Node of disconnect; DQ/SS Join Request (0x05) Request by Cluster Node to Join DQ/SS; DQ/SS Join Confirmed (0x06) Confirmation of Cluster Node being accepted into DQ/SS; DQ/SS Re-Cluster Command (0x07) Broadcast Command from cluster head to reconfigure the DQ/SS due to a change in the DQ/SS; DQ/SS Re-Cluster Acknowledge (0x08) Acknowledgement from individual Cluster Nodes of the DQ/SS Reconfiguration; Link Quality SNR Exchange Request (0x09) Request from Cluster Node or cluster head for SNR information from a specific Cluster Node; Link Quality SNR Exchange Response (0x0A) Response from Cluster Node to whom the SNR information was directed to; Bandwidth Management Command (0x0B); Bandwidth Management Acknowledge (0x0C); Maximum frame Size Command (0x0D); Switch Queue Command (0x0E); Pause Queue Command (0x0F) command can only occur within the Feedback Packet and causes the immediate cessation of application data for all subsequent transmission sequences pending further notice. This includes the case of the command being issued during the transmission of a multi-PDU frame. If the command occurs within the sequence of a multi-PDU frame, the continuation of that message is paused effectively immediately and is not resumed until a "Resume Queue" command is later issued by the cluster head.

Pause Queue, Enable Join Request for Mini-Slot n (0x10). This command has the same effect as the Pause Queue Command (0x0F), but with two additional side-effects: the ARS is eliminated during the immediate transmission sequence. Thus, this is the notification to all stations so that they may abide by it, and the Station making the join request within ARS Mini-Slot (n) of the prior ARS segment is directed to issue a Join Request Directive within the DQ PDU Payload Segment of the next transmission sequence. Assuming successful transmission of this directive, the subsequent Feedback Packet will contain feedback as to the determination and resultant actions of the Join Request for ARS Mini-Slot (n). Resume Queue (0x13) Command from cluster head to resume the Transmission Queue.

Figure 25:
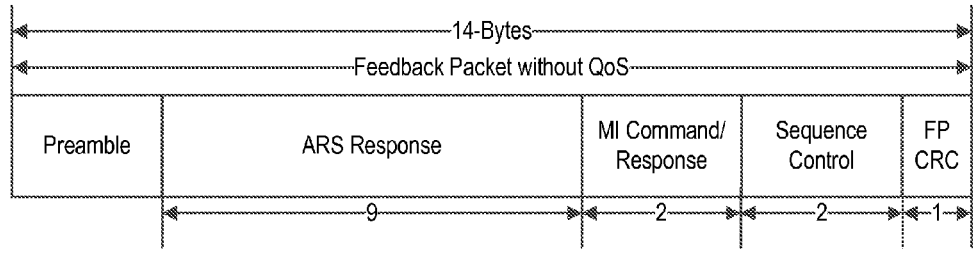
FIG. 25 illustrates a Management Segment Structure of an embodiment.
Figure 26:
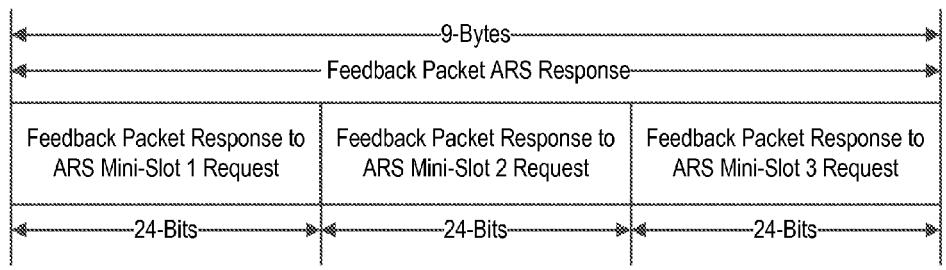
FIG. 26 illustrates an ARS response from cluster head of an embodiment.
Figure 27:
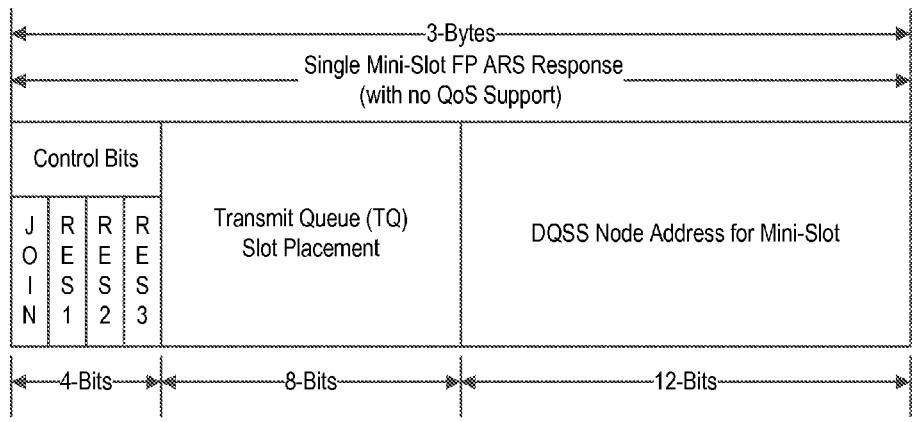
FIG. 27 illustrates a cluster head Mini-Slot Response of an embodiment.

The DQ/SS Management Segment has three primary functions: to provide the cluster head a means in which to manage the DQ/SS and associated nodes from the perspective of membership, Quality of Service (QoS), and both queues (i.e. Data Queue and Request Queue); to provide feedback to the other nodes in the system for both data and control information; to signify and thus mark the end of a single transmission sequence, therefore providing a beacon to all stations for synchronizations purposes. FIG. 25 illustrates a DQ/SS Management Segment Structure of an embodiment. As shown, the DQ/SS Management Segment or FP consists of five sections: Preamble; ARS Response; MI Command or Response; Sequence Control; Feedback Packet 8-Bit CRC. Other than the "Preamble," which is self-explanatory; each one will now be described in detail. FIG. 26 illustrates an ARS Response from cluster head of an embodiment. FIG. 27 illustrates a cluster head ARS Mini-Slot Response Format of an embodiment.

Feedback Packet (FP) MI Command/Response. In some embodiments, the Sequence Control field can be meaningless except when the "Immediate Destination" address is that of the cluster head, in which case it is giving immediate acknowledgement to the originating node for the immediately preceding packet segment of the same DQ Transmission frame. FIG. 9 illustrates a DQ Feedback Packet Sequence Control Field of an embodiment. $N_s$ represents the Sequence Number of the last segment it sent out to the originating node in the Packet portion of the DQ transmission sequence; while Nr represents the last sequence number it received from the originating node in the Packet portion of the DQ Transmission frame. Feedback Packet CRC is an 8-bit CRC of the entire Feedback Packet, including the CRC itself.

Some aspects of this disclosure relate generally to systems and methods relating to user devices for use during emergency procedures, security procedures, and general access procedures. In particular, the disclosure relates to providing a "Location Services" environment for connecting multiple individuals associated with respective user devices, and for communicating with an individual associated with a particular user device. The network may also collect and store data relating to a geographic region in which the individual is present. Such data may include emergency conditions, emergency services, or other environmental data. An electronic model of a total represented area may also be maintained. The electronic model may comprise an aggregate number of subset models each representing subset areas of the total area. The individual's data and the geographic data may be used by the network to carryout various features of the disclosure. For example, an exemplary network may use the data to identify an individual's location relative to an overall network topology. The network may, for example, locate a user device in two or three dimensions using the stored data. X and Y coordinates may be obtained via a combination of RSSI localization algorithms for determining relative position, tracking of movements using an accelerometer to determine distance travelled, and/or tracking of direction using a magnetometer. Z coordinates may be obtained via a pressure sensor (the one currently selected resolves down to less than 6 inches. Using information obtained from the user device, a user device access point, and a physical configuration map, the location of various user devices in a represented/modeled area may be determined.

Figure 28:
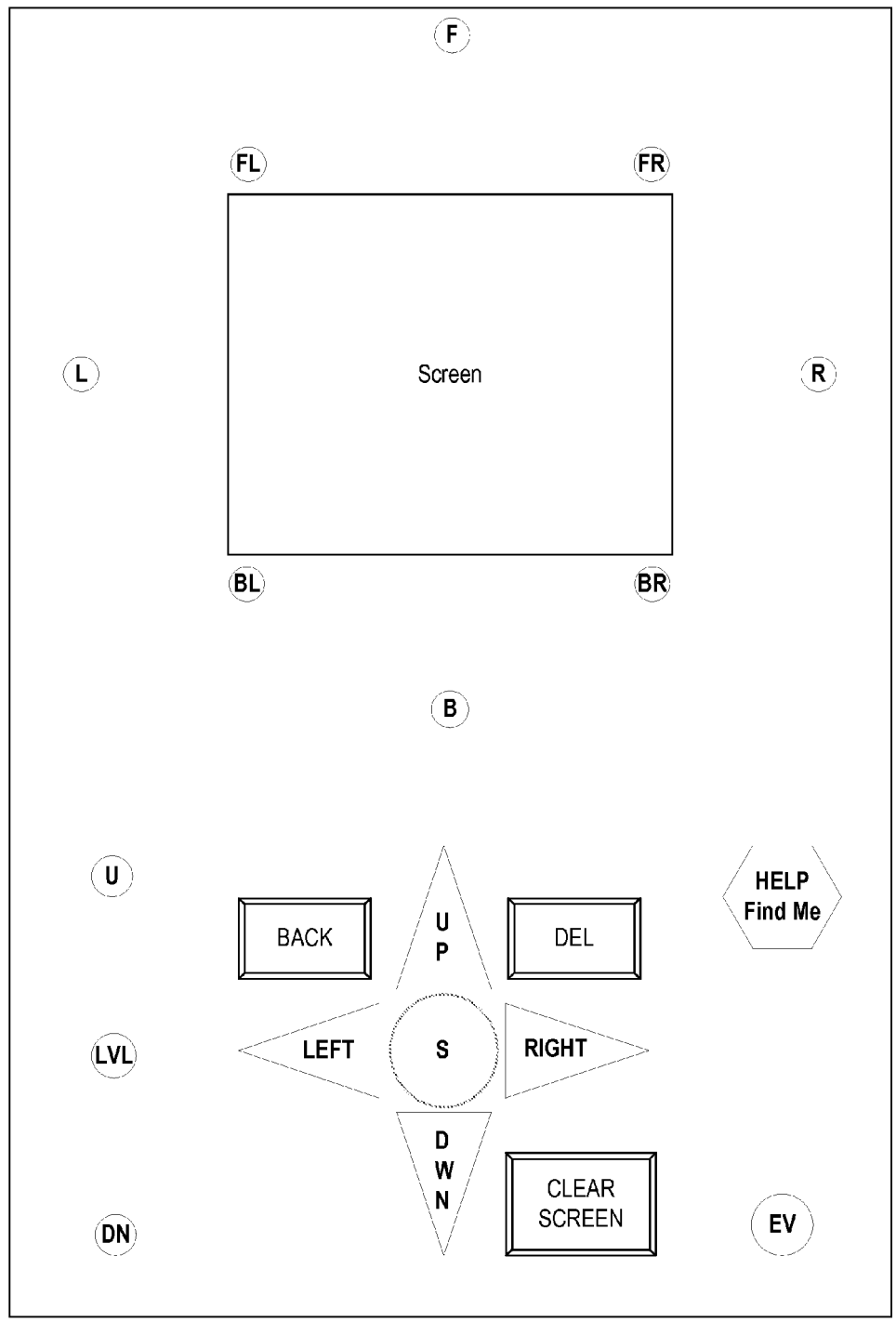
FIG. 28 shows a user device that may include various indicators of an embodiment.

Attention is first drawn to FIG. 28, which shows a user device that may include various indicators, including: a screen, a front LED (F), a Front-Left LED (FL), a Front-Right LED (FR), a Left LED (L), a Right LED (R), a Back-Left LED (BL), a Back-Right LED (BR), a Back LED (B), a Up LED (U), a Down LED (DN), a Level LED (LVL), and an Evacuate LED (EV). The screen may include an E-Ink color screen (e.g., Interferometric Modulation MEMS technology). The screen may sense light level and employs a low-power front-light when needed. The Front LED may indicate when a user device user should continue moving straight ahead with respect to the user's current position and orientation. The Front-Left LED may indicate when a user device user should re-orient his/herself in a forward left-direction (e.g., 315° from his/her present orientation). Similarly, the other LEDs may indicate when a user device user should re-orient his/herself. For example, the Front-Right LED indicates a forward right-direction (e.g., 45°), the Left LED indicates an immediate left turn (e.g., 270°), the Right LED indicates an immediate right turn (e.g., 90°), the Back-Left LED indicates a backward left direction (e.g., 225°), the Back-Right LED indicates a backward right direction (e.g., 135°), and the Back LED indicates an immediate about-face (e.g., 180°).

The Up LED may indicate when a user should move vertically upwards at his or her earliest availability. For example, the Up LED may indicate a movement up a flight of stairs or up a geographic feature (e.g., mountain range, above a tree line). Similarly, the Down LED may indicate when a user should move vertically downwards at his or her earliest availability. For example, the Down LED may indicate movement down one or more floors in a building, or down a mountain. The Level LED may indicate when a user should remain in his or her current vertical position. The Evacuate LED may indicate when a user should find the nearest available exit. This is particularly important if in an area where alarm systems are not available or difficult to sense, or when the user cannot hear or otherwise sense an alarm (e.g., when a user has a hearing disorder).

The user device may further include various buttons, including: an UP button (UP), Down button (DWN), Left button (LEFT), Right button (RIGHT), Select button (S), Back button (BACK), Delete button (DEL), Help Find Me button (HELP), and a Clear Screen button (CLEAR). The Up, Down, Left and Right buttons may be used to respectively move the cursor on the display up one space, down one space, left one space, and right one space. The Select button may be used to select whatever the cursor is covering on the screen, and may also serve as a return key if in a "Text Message Input Mode." The Back button may be used to erase the character behind the cursor, and the Delete button may be used to delete the character in front of the cursor.

The Help Find Me button may be selected/activated by a user to indicate that the user needs help (e.g., when the user is incapacitated such that he or she cannot progress any further beyond his or her current position and requires assistance, if available, to continue movement). The Clear Screen button may be used to clear the entire screen of any user generated input, or other information. Under certain settings, activation of the Clear Screen button may be prohibited from clearing the other information. Although the above disclosure relates to a device with LEDs and buttons, it is contemplated that various aspects of the disclosure may be implemented on touch screens that display the indicators and buttons.

Use Cases

The systems and methods disclosed herein may be applied in various environments, including: Oil Rigs; Coal and Other Mines; Rail Car and Rail Line Workers; Rail yard Maintenance Facilities; Airport Hanger & Maintenance Facilities; Secure Government Facilities; Court Houses; R&D Centers; Vehicle Inter-car (V2V) Communications; Vehicle to Infrastructure (V2I) Communications; Casinos; Cruise Ships; Resorts; and Theme Parks. The systems and methods disclosed herein may be used to accomplish the following: Disaster assistance to direct people to safety and locate those in harm's way; Electronic child tethering to parents in large, crowded, risk environments; Electronic guest services for resorts, casinos, amusement parks, and cruise ships; Employee tracking and presence; Security perimeters; and Asset Tracking.

Additional Aspects

One or more aspects may relate to systems, methods, means and computer program products for carrying out the embodiments described herein. Systems may include a processing component operable to implement any of the methods described herein. Computer program products may include a non-transitory computer usable medium having a computer readable program code embodied therein that is adapted to be executed to implement those methods.

A system may comprise any or all of: a plurality of authorized nodes configured to transmit position information associated with a plurality user devices; a cluster head configured to distribute a list of the authorized nodes, where the cluster head is configured to transition among different ones of the authorized nodes depending on one or more conditions; and a gateway, where the gateway is configured to transition with the cluster head.

In some cases, the cluster head is configured to transition from a first node to a second node when data transmission through the second node is greater than data transmission through the first node. In some cases, the cluster head is configured to transition from a first node to a second node when hardware in the first node fails. In some cases, the cluster head is configured to transition from a first node to a second node when energy consumption at the first node is greater than energy consumption at the second node. In some cases, the system receives an instruction that prohibits all transitions of the cluster head, and the cluster head is configured to remain at one node despite the one or more conditions based on the instruction. In some cases, the system is configured to receive a request from an unauthorized node, the request is a request to become an authorized node, the system is configured to authorize the unauthorized node, the system is configured to update a list of the authorized nodes to include the unauthorized node, and the system is configured to transmit the updated list of the authorized nodes to all authorized nodes. In some cases, the authorized nodes are not permitted to exchange certain information with nodes that are not on the list of the authorized nodes. In some cases, one port of the node at which the gateway and cluster head reside services the gateway. In some cases, the system is configured to receive an access request from a first node of the authorized nodes, and the access request is a request to transmit information to a second node of the authorized nodes using a first transmission channel. In some cases, each of the authorized nodes transmits information using a unique bit pattern, the cluster head is configured to detect collisions associated with simultaneous transmissions from two of the authorized nodes by comparing a bit pattern associated with the overlapping simultaneous transmissions and the unique bit patterns of the two authorized nodes. In some cases, the access request includes a node address field with a node cluster bit that is set to zero and a node join request bit. In some cases, each of the authorized nodes are configured to keep its identity before, during and after hosting the cluster head.

Other Aspects

It is understood that the specific order components disclosed herein are examples of exemplary approaches. Based upon design preferences, it is understood that the specific order components may be rearranged, and/or components may be omitted, while remaining within the scope of the present disclosure unless noted otherwise. The previous description of the disclosed embodiments is provided to enable any person skilled in the art to make or use the present disclosure. Various modifications to these embodiments may be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The various illustrative systems, methods, logical features, blocks, modules, components, circuits, and algorithm steps described herein may be implemented, performed, or otherwise controlled by suitable hardware known or later developed in the art, or by software executed by a processor and also inclusive of any number of processors), or by both. A processor (also referred to as a "processing device") may perform any of the processing steps, computational steps, method steps, or other functionality disclosed herein, including analysis, manipulation, conversion or creation of data, or other operations on data. A processor may include a general purpose processor, a digital signal processor (DSP), an integrated circuit, server, other programmable logic device, or any combination thereof. A processor may be a conventional processor, microprocessor, controller, microcontroller, or state machine. A processor can also refer to a chip. The term "processor" may refer to one, two or more processors of the same or different types. It is noted that the terms "computer" or "computing device" or "user device" or the like may refer to devices that include a processor, or may refer to the processor itself. Software may reside in RAM memory, flash memory, ROM memory, EPROM memory, EEPROM memory, registers, hard disk, a removable disk, a CD-ROM, or any other form of storage medium. A "memory" may be coupled to a processor such that the processor can read information from and write information to the memory. The storage medium may be integral to the processor. Software may be stored on or encoded as one or more instructions or code on a computer-readable medium. Computer-readable media be any available storage media, including non-volatile media (e.g., optical, magnetic, semiconductor) and carrier waves that transfer data and instructions through wireless, optical, or wired signaling media over a network using network transfer protocols. Aspects of systems and methods described herein may be implemented as functionality programmed into any of a variety of circuitry, including. Aspects may be embodied in processors having software-based circuit emulation, discrete logic, custom devices, neural logic, quantum devices, PLDs, FPGA, PAL, ASIC, MOSFET, CMOS, ECL, polymer technologies, mixed analog and digital, and hybrids thereof. Data, instructions, commands, information, signals, bits, symbols, and chips that may be referenced throughout the above description may be represented by voltages, currents, electromagnetic waves, magnetic fields or particles, optical fields or particles, or any combination thereof. Computing networks may be used to carry out aspects and may include hardware components (servers, monitors, I/O, network connection). Application programs may carry out aspects by receiving, converting, processing, storing, retrieving, transferring and/or exporting data, which may be stored in a hierarchical, network, relational, non-relational, object-oriented, or other data source. "Data" and "information" may be used interchangeably. The words "comprise," "comprising," "include," "including" and the like are to be construed in an inclusive sense (i.e., not limited to) as opposed to an exclusive sense (i.e., consisting only of). Words using the singular or plural number also include the plural or singular number respectively. The words "or" or "and" cover any of the items and all of the items in a list. "Some" and "any" and "at least one" refers to one or more. The term "device" may comprise one or more components (e.g., a processor, a memory, and/or a screen). Features in system and apparatus figures that are illustrated as rectangles may refer to hardware or software. It is noted that lines linking two such features may be illustrative of data transfer between those features. Such transfer may occur directly between those features or through intermediate features even if not illustrated. Where no line connects two features, transfer of data between those features is contemplated unless otherwise stated. Accordingly, the lines are provide to illustrate certain aspects, but should not be interpreted as limiting. A data source which is depicted as a single storage device may be realized by multiple (e.g., distributed) storage devices. A data source may include one or more types of data sources, including hierarchical, network, relational, non-relational, object-oriented, or another type of data source. As used herein, computer program products comprising computer-readable media including all forms of computer-readable medium except, to the extent that such media is deemed to be non-statutory, transitory propagating signals. Computer program products may include a non-transitory computer usable medium having a computer readable program code embodied therein that is adapted to be executed to implement the various methods disclosed herein and claimed.

While various embodiments of the present disclosure have been described in detail, it may be apparent to those skilled in the art that the present disclosure is embodied in various other forms not specifically described herein.

The invention claimed is:

1. A system comprising:
   a plurality of authorized nodes configured to conduct a transmission of position information associated with a plurality user devices positioned along at least one physical pathway of travel, wherein the transmission is to include a plurality of request slots usable by the authorized nodes for a request;
   a cluster head configured to distribute a list of the authorized nodes, transition among different ones of the authorized nodes depending on one or more conditions, and detect collisions associated with simultaneous transmissions from two of the authorized nodes by comparing a bit pattern that results from the simultaneous transmissions and bit patterns of the two authorized nodes, wherein collision detection is to be performed in less time than a data transmission time based on a number of the plurality of request slots; and
   a gateway configured to transition with the cluster head.

2. The system of claim 1, wherein the cluster head is configured to transition from a first node to a second node when data transmission through the second node is greater than data transmission through the first node.

3. The system of claim 1, wherein the cluster head is configured to transition from a first node to a second node when hardware in the first node fails.

4. The system of claim 1, wherein the cluster head is configured to transition from a first node to a second node when energy consumption at the first node is greater than energy consumption at the second node.

5. The system of claim 1, wherein the system receives an instruction that prohibits all transitions of the cluster head, and wherein the cluster head is configured to remain at one node despite the one or more conditions based on the instruction.

6. The system of claim 1, further configured to
   receive the request from an unauthorized node, wherein the request slots are to be usable by the unauthorized node for the request, and wherein the request is an unauthorized node request to become an authorized node,
   authorize the unauthorized node,
   update the list of the authorized nodes to include the unauthorized node, and
   transmit the updated list of the authorized nodes to the authorized nodes identified by the updated list of the authorized nodes, wherein the cluster head is to distinguish between two or more request slots states to detect collisions, the request slots states including a no access request sequence (ARS) sent state, a one ARS sent state, and a more than one ARS sent state.

7. The system of claim 6, wherein authorized nodes are not permitted to exchange certain information with nodes that are not on the list of the authorized nodes.

8. The system of claim 1, wherein one port of the node at which the gateway and cluster head reside services the gateway.

9. The system of claim 1, wherein the system is configured to receive an access request from a first node of the authorized nodes, wherein the access request is a request to transmit information to a second node of the authorized nodes using a first transmission channel.

10. The system of claim 9, wherein each of the bit patterns of the authorized nodes is a unique bit pattern.

11. The system of claim 9, wherein the access request includes a node address field with a node cluster bit that is set to zero and a node join request bit.

12. The system of claim 1, wherein each of the authorized nodes are configured to keep its identity before, during and after hosting the cluster head.

13. The system of claim 1, wherein the plurality of authorized nodes are further configured to transmit at least one environmental parameter to determine the at least one physical pathway along which to travel in compliance with at least one of emergency procedures, security procedures and general access procedures, to activate and test evacuation flow lights, and to manage emergency exits, building fire separation and building exits, wherein the environmental parameter includes one or more of emergency conditions or emergency services.

14. An apparatus comprising:
    a first node comprising at least one port and a transmitter, wherein the transmitter is to conduct a transmission of position information associated with one or more computing devices positioned along at least one physical pathway of travel, wherein the transmission is to include a plurality of request slots usable for a request, wherein the first node is designated as one or more of an authorized node or a cluster head, wherein the first node, when designated the cluster head, is to
       distribute a list including the first node to one or more other authorized nodes,
       transition the cluster head designation from the first node based on one or more conditions, and
       detect collisions associated with simultaneous transmissions from two or more of the first node and the one or more other authorized nodes in less time than a data transmission time based on a number of the plurality of request slots, by comparing a bit pattern that results from the simultaneous transmissions and bit patterns of the two or more of the first node and the other authorized nodes; and
    wherein the cluster head and a gateway reside in the port, and the port services the gateway, wherein the gateway is to transition with the cluster head designation from the first node based on the one or more conditions.

15. The apparatus of claim 14, wherein the transition of the cluster head designation from the first node is to be transitioned to one of the one or more other authorized nodes based on the one or more conditions, wherein the cluster head designation is to transition from the first node to one of the other authorized nodes when data transmission through the one of the other authorized nodes is greater than data transmission through the first node, and wherein the cluster head is to transition from the first node to one of the other authorized nodes when hardware in the first node fails.

16. The apparatus of claim 14, wherein the transition of the cluster head designation from the first node is to be transitioned to one of the one or more other authorized nodes when energy consumption at the first node is greater than energy consumption at the one of the other authorized nodes, and wherein, when the apparatus receives an instruction that prohibits transitions of the cluster head designation, the cluster head designation is to remain at the first node despite the one or more conditions based on the instruction.

17. The apparatus of claim 14, wherein the apparatus is to receive the request from an unauthorized node, wherein
the request slots are to be usable by one or more of the unauthorized nodes for the request, wherein the request is to become an authorized node,
authorize the unauthorized node,
update the list of the authorized nodes to include the unauthorized node, wherein the cluster head is to distinguish between two or more request slots states to detect collisions, the request slots states including a no access request sequence (ARS) sent state, a one ARS sent state, and a more than one ARS sent state, and
transmit the updated list of the authorized nodes to all authorized nodes.

18. The apparatus of claim 14, wherein the first node, when designated the authorized node, is not permitted to exchange certain information with one or more unauthorized nodes that are not on the list of the authorized nodes, and wherein the first node, when designated as the cluster head, is to keep its identity before, during and after hosting the cluster head.

19. The apparatus of claim 14, further to receive an access request from the first node, wherein the access request is a request to transmit information to the one or more of the other authorized nodes using a first transmission channel,
wherein each of the bit patterns of the authorized nodes is a unique bit pattern, wherein the access request includes a node address field with a node cluster bit that is set to zero and a node join request bit,
wherein the first node is to keep its identity before, during and after hosting the cluster head, and transmit at least one environmental parameter to determine the at least one physical pathway to travel in compliance with at least one of emergency procedures, security procedures and general access procedures, to activate and test evacuation flow lights, and to manage emergency exits, building fire separation and building exits, and
wherein the environmental parameter includes one or more of emergency conditions or emergency services.

20. At least one non-transitory computer readable storage medium comprising a set of instructions, which when executed by a computing device, cause the computing device to:
conduct, via a transmitter from a first node comprising at least one port and the transmitter, a transmission of position information associated with one or more computing devices positioned along at least one physical pathway of travel, wherein the transmission is to include a plurality of request slots usable for a request, wherein the first node is to be designated as one or more of an authorized node or a cluster head, and wherein the first node, when designated the cluster head, is to
distribute a list including the first node to one or more other authorized nodes,
transition the cluster head designation from the first node based on one or more conditions, and
detect collisions associated with simultaneous transmissions from two or more of the first node and the other authorized nodes in less time than a data transmission time based on a number of the plurality of request slots, by comparing a bit pattern that results from the simultaneous transmissions and bit patterns of the two or more of the first node and one or more of the other authorized nodes,
wherein the cluster head and a gateway are to reside in the port, and the port services the gateway, and
wherein the gateway is configured to transition with the cluster head designation from the first node based on the one or more conditions.

21. The at least one non-transitory computer readable storage medium of claim 20, wherein the transition of the cluster head designation from the first node is to be transitioned to one of the one or more other authorized nodes based on the one or more conditions, wherein the first node, when designated the cluster head, is to transition the cluster head designation from the first node to one of the other authorized nodes when data transmission through the one of the other authorized nodes is greater than data transmission through the first node, and wherein the cluster head is to transition from the first node to one of the other authorized nodes when hardware in the first node fails.

22. The at least one non-transitory computer readable storage medium of claim 20,
wherein the transition of the cluster head designation from the first node is to be transitioned to one of the one or more other authorized nodes based on the one or more conditions,
wherein the first node, when designated the cluster head, is to transition the cluster head designation from the first node to one of the other authorized nodes when energy consumption at the first node is greater than energy consumption at the one of the other authorized nodes,
wherein the instructions, when executed, further cause the computing device to receive an instruction that prohibits transitions of the cluster head, and
wherein the first node, when designated the cluster head, is to remain as the cluster head despite the one or more conditions based on the instruction.

23. The at least one non-transitory computer readable storage medium of claim 20, wherein the instructions, when executed, further cause the computing device to:
receive the request from an unauthorized node, wherein the request slots are to be usable by one or more of the unauthorized nodes for the request, wherein the request is to become an authorized node,
authorize the unauthorized node,
update the list of the authorized nodes to include the unauthorized node, wherein the first node, when designated the cluster head, is to distinguish between two or more request slots states to detect collisions, the request slots states including a no access request sequence (ARS) sent state, a one ARS sent state, and a more than one ARS sent state, and
transmit the updated list of the authorized nodes to all authorized nodes.

24. The at least one non-transitory computer readable storage medium of claim 20, wherein the first node, when the first node is designated the authorized node, is not permitted to exchange certain information with an unauthorized node not on the list of the authorized nodes, and wherein the first node, when designated the authorized node, is to keep its identity before, during and after hosting the cluster head.

25. The at least one non-transitory computer readable storage medium of claim 20, wherein the instructions, when executed, further cause the computing device to:

receive an access request from the first node, when the first node is designated the authorized node, wherein the access request is a request to transmit information to the one or more of the other authorized nodes using a first transmission channel, wherein each of the bit patterns of the authorized nodes is a unique bit pattern, wherein the access request includes a node address field with a node cluster bit that is set to zero and a node join request bit, wherein the first node is to keep its identity before, during and after hosting the cluster head, wherein the first node, when designated the authorized node, is to transmit at least one environmental parameter to determine the at least one physical pathway to travel in compliance with at least one of emergency procedures, security procedures and general access procedures, to activate and test evacuation flow lights, and to manage emergency exits, building fire separation and building exits, and wherein the environmental parameter includes one or more of emergency conditions or emergency services.

\* \* \* \* \*